United States Patent Office 2,762,824
Patented Sept. 11, 1956

2,762,824

MANUFACTURE OF SILICON COMPOUNDS

Herbert C. Brown, West Lafayette, Ind., assignor to Ethyl Corporation, New York, N. Y., a corporation of Delaware No Drawing. Application June 16, 1953,
Serial No. 362,127

4 Claims. (Cl. 260—448.2)

This invention relates to the manufacture of silicon compounds and more particularly to a new process for making organo silicon halides.

Organo silicon halides, as for example methyl silicon chlorides ($MeSiCl_3$, $Me_2SiCl_2$, $Me_3SiCl$), are manufactured commercially by the use of Grignard reagents, elemental silicon or copper alloys. These processes have several disadvantages particularly with regard to the economics of the use of catalysts and reagents.

It is accordingly an object of this invention to provide an improved process for the manufacture of organo silicon halides. Another object is to provide a method for preparing compounds of the above type from relatively inexpensive starting materials. Other objects and advantages of this invention will become apparent as the description proceeds.

It has now been discovered that organo silicon halides such as the alkyl and aryl silicon halides can be manufactured directly from the corresponding alkyl and aryl aluminum halides by reaction with silicon tetrafluoride. These alkyl and aryl aluminum halides can be prepared by well known means from alkyl or aryl halides and aluminum. The silicon tetrafluoride can itself be produced in the process by reaction of silica with the aluminum trifluoride formed along with the organo aluminum halides, noted above. Accordingly, the only reactants required in the overall process as a fresh feed are elemental aluminum and silica, both relatively inexpensive.

The reaction steps of the process of the present invention can be represented by the following equations:

(1) $\quad 4Al + 6MeCl \rightarrow 2Me_3Al_2Cl_3$
(2) $\quad 2Me_3Al_2Cl_3 + 3SiF_4 \rightarrow 4AlF_3 + 3Me_2SiCl_2$
(3a) $\quad 4AlF_3 + 3SiO_2 \rightarrow 3SiF_4 + 2Al_2O_3$
(3b)
$\quad 4AlF_3 + 3SiO_2 + 6H_2SO_4 \rightarrow 3SiF_4 + 2Al_2(SO_4)_3 + 6H_2O$ Equations 3a and 3b above are alternate steps for producing silicon tetrafluoride. In both instances, the silicon tetrafluoride is produced from the aluminum trifluoride by treatment with silica.

A wide variety of organo silicon halides can be manufactured according to this invention. Typical examples of alkyl substitutions are methyl, ethyl, propyl, isopropyl, normal butyl, isobutyl and heptyl.

Normally, the halides which are most useful in this invention are confined to the chlorides, bromides and iodides. Although slight reaction is obtained with some fluorides, they are of generally less importance.

Typical examples of alkyl and aryl halides suitable for reaction with aluminum in Equation 1 above are methyl chloride, ethyl chloride, isopropyl chloride, n-propyl chloride, ethyl bromide, methyl bromide, methyl iodide, ethyl iodide, n-propyl iodide, isopropyl iodide, hexyl iodide, heptyl iodide, octyl iodide, p-tolyl iodide, and phenyl iodide.

Each of the above alkyl and aryl halides result in corresponding alkyl or aryl silicon halides. For example, when methyl chloride is employed, the final product is an essentially equal mixture of $(CH_3)_3SiCl$, $(CH_3)_2SiCl_2$ and $CH_3SiCl_3$. Likewise, when ethyl chloride or methyl bromide is employed the final products are $(C_2H_5)_3SiCl + (C_2H_5)_2SiCl_2 + C_2H_5SiCl_3$ and $(CH_3)_3SiBr + (CH_3)_2SiBr_2 + CH_3SiBr_3$ respectively.

Other typical examples of organo silicon halides which can be made by this invention are as follows: diphenyl silicon iodide, thienyl silicon iodide, naphthyl silicon bromide, naphthyl silicon iodide, benzyl silicon chloride, methoxy silicon iodide and ethoxy silicon iodide.

Reaction (1) listed above is a well known reaction and is only illustrative of a preferred means of producing the alkyl or aryl aluminum halide. The reaction can be carried out in the presence of a catalyst, such as aluminum chloride or iodine. In general, it is desired to use between about 0.05–0.2% of catalyst based upon the weight of the aluminum. A more preferred range of catalyst is 0.075–0.15%. Higher concentrations can be used, but such concentrations do not materially increase the reaction rate and also tend to contaminate the product. In some cases, lower concentrations can be employed.

The reaction is generally carried out at a pressure of between about 1 and 20 atmospheres. Normally, it is preferred to maintain the pressure between about 1 and 5 atmospheres. The temperature of reaction (1) noted above should be maintained below 100° C. and above about 0° C. Below the latter temperature, the reaction rate is materially reduced. A preferred temperature of operation is between 40°–70° C. This reaction should be normally carried out in the absence of any solvent, since in many instances the catalyst tends to form a complex with the solvent.

A wide variety of concentrations of reactants can be employed in this reaction. However, stoichiometric quantities are generally preferred. Also, it is normally preferred to use the aluminum in the form of chips, granules or other subdivided form.

The reaction can be carried out in a wide variety of reaction vessels. A glass-lined stirred autoclave is ordinarily preferred. However, in a continuous operation, a tube type reactor can be employed.

The redistribution reaction (2) above is preferably carried out in the absence of a solvent and without the use of a catalyst. The pressure of the reaction can be between 1 and 50 atmospheres, although it is preferred to maintain the pressure between about 5 and 20 atmospheres. The temperature of the reaction, not particularly critical, generally should be above about 150° C. and below about 600° C. A more preferred reaction temperature is between about 190°–300° C.

The molecular ratio of silicon tetrafluoride to organo aluminum halide should be normally between about 1–3. Maximum yields are normally obtained when a slight excess of silicon tetrafluoride is employed, corresponding to a molar ratio of between about 1.3–1.5.

This redistribution reaction can be also carried out in a wide variety of process equipment. A glass-lined autoclave is particularly suitable for this reaction.

The silicon tetrafluoride production operation, in accordance with Equation 3a above, should be carried out at atmospheric pressure or under a slight vacuum. Normally, the most desirable pressure for this reaction is between about 0.1 to 1 atmospheres. The temperature of the reaction is generally maintained between 800°–1200° C. with a preferred temperature range of 1000°–1200° C. Higher reaction temperatures are somewhat limited by the sublimation temperature of aluminum trifluoride.

The reaction can be carried out using stoichiometric quantities of aluminum trifluoride and silica. However, some variations in these proportions do not materially affect the reaction. The formation of the silicon tetrafluoride is preferably carried out in a furnace. The latter is normally lined with refractory material provided with suitable heating means and maintained under a slight vacuum.

As an alternate and preferred method for the recovery of the silicon tetrafluoride (Reaction 3a noted above), the reaction can be carried out using sulfuric acid. The latter preferably should have a concentration of at least 97%. The pressure of the reaction will, in general, be the autogenous pressure of $SO_3$ and $SiF_4$, which pressure is controlled by the temperature of the system. The temperature should be between about 350° and 500° C., preferably 350°–450° C. Although lower temperatures can sometimes be employed, the process is limited by lower reaction rates. Although temperatures higher than 500° C. are normally suitable, the temperature is generally limited by known materials of construction.

The pressure of this reaction can be controlled, by bleeding controlled quantities of silicon tetrafluoride from the reactor vessel. Sulfuric acid vapors are also removed with the silicon tetrafluoride, but the gas phase can be separated by condensation of the sulfuric acid, which then can be recycled to the reactor. The silicon tetrafluoride formed in this reaction can be recycled for use in the reaction step, identified as Equation 2 above.

The following are working examples which illustrate the benefits and features of this invention. All quantities given in these examples are in parts by weight.

Example I

Granular aluminum alloy (4.65 parts) containing 8% copper is placed in a glass-lined stirred autoclave. Aluminum chloride (0.005 part) was placed on top of the aluminum alloy charge and used as a catalyst in the reaction. Then 13 parts of methyl chloride in the absence of a solvent are added slowly to the autoclave, so as to maintain a temperature of 60° C. and a pressure of 3 atmospheres. A product is obtained which is essentially an equal molecular mixture of $(CH_3)_2AlCl$ and $CH_3AlCl_2$. Ten parts of methyl aluminum chlorides prepared as above are then placed in a second glass-lined autoclave in the absence of either a catalyst or a solvent and 6.7 parts of silicon tetrafluoride (mole ratio of $SiF_4$ to $Me_3Al_2Cl_3$ of 1.32) is added to the autoclave. The temperature of the reaction is maintained at 200°–220° C. for two hours under a pressure of 15 atmospheres. After cooling, the unreacted silicon tetrafluoride is exhausted into a condensation trap. The methyl silicon chlorides are then decanted from the aluminum trifluoride and distilled in a fractionating column to recover the individual methyl silicon chlorides in relatively pure form.

The aluminum trifluoride recovered is converted to silicon tetrafluoride by reaction with 8 parts of silica in a refractory lined furnace. The temperature of the furnace is maintained at 1100° C. for ten hours and under a slight vacuum of about 0.8 atmospheres. The silicon tetrafluoride is removed as formed from the furnace, cooled and then reacted with the methyl aluminum chlorides.

Example II

Example I is repeated except that the aluminum trifluoride is reacted with silica in the presence of sulfuric acid of 96–100% concentration. In this case, about 4.5 parts by weight of aluminum trifluoride is reacted with 2.5 parts by weight of silica. The temperature of the reaction is maintained at about 425° C. The silicon tetrafluoride formed is bled off from the reactor to control the pressure below about 20 atmospheres. The sulfuric acid is used in considerable excess, about 83 parts by weight. The silicon tetrafluoride is purified by condensing out $H_2SO_4$ impurity and recycled for reaction with methyl aluminum chloride in reaction (2) above.

Example III

Examples I and II are repeated except that methyl bromide and methyl iodide are employed instead of methyl chloride. The corresponding methyl bromide and methyliodosilanes are obtained.

Example IV

Examples I and II are repeated except that ethyl chloride, ethyl bromide, ethyl iodide, n-propyl iodide, phenyl iodide, and p-tolyl iodide are substituted for the methyl chloride and reacted with aluminum. In these cases, the corresponding ethylchlorosilanes, ethylbromosilanes, ethyliodosilanes, phenyliodosilanes, p-tolyliodosilanes are obtained in these reactions.

I claim:
1. A process for the manufacture of a hydrocarbon silicon halide comprising reacting a hydrocarbonaluminum halide with silicon tetrafluoride at a temperature between about 190° C. and about 600° C., the molecular ratio of silicon tetrafluoride to the hydrocarbonaluminum halide being between about 1 and 3.
2. The process of claim 1 wherein the molecular ratio of silicon tetrafluoride to hydrocarbonaluminum halide is between about 1.3 and 1.5.
3. A process for the manufacture of a hydrocarbon silicon halide comprising reacting an equimolar mixture of methyl aluminum dichloride and dimethylaluminum chloride with silicon tetrafluoride at a temperature between about 150° C. and 600° C., the molecular ratio of silicon tetrafluoride to the said mixture of dimethylaluminum chloride and methylaluminum dichloride being between about 1 and 3.
4. A process for the manufacture of a hydrocarbon silicon halide comprising reacting a hydrocarbonaluminum halide with silicon tetrafluoride at a temperature between about 150° C. and about 600° C. and a reaction pressure between about 5 and 20 atmospheres, the molecular ratio of silicon tetrafluoride to the hydrocarbonaluminum halide being between about 1 and 3.

References Cited in the file of this patent
UNITED STATES PATENTS 2,403,370    Hurd _____ July 2, 1946

OTHER REFERENCES

Hurd: "Journal Am. Chem. Soc.," vol. 67 (1945) (pp. 1545–1548).

Chem. Abstracts, vol. 45 (1951), page 5014, abstract of article by Ivanova.